United States Patent
Hegewald et al.

(10) Patent No.: US 10,358,023 B2
(45) Date of Patent: Jul. 23, 2019

(54) TRANSPORT VEHICLE FOR CONTAINERS, COMPRISING A BATTERY MODULE FOR SUPPLYING THE DRIVE UNIT

(71) Applicant: TEREX MHPS GMBH, Düsseldorf (DE)

(72) Inventors: Mike Hegewald, Düsseldorf (DE); Jannis Moutsokapas, Monheim (DE); Peter Köhn, Düsseldorf (DE)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 15/773,116

(22) PCT Filed: Nov. 3, 2016

(86) PCT No.: PCT/EP2016/076577
§ 371 (c)(1),
(2) Date: May 2, 2018

(87) PCT Pub. No.: WO2017/076980
PCT Pub. Date: May 11, 2017

(65) Prior Publication Data
US 2018/0319263 A1 Nov. 8, 2018

(30) Foreign Application Priority Data

Nov. 7, 2015 (DE) .......................... 10 2015 119 193

(51) Int. Cl.
*B60K 1/04* (2019.01)
*B60P 1/64* (2006.01)
(Continued)

(52) U.S. Cl.
CPC ................ *B60K 1/04* (2013.01); *A62C 27/00* (2013.01); *B60L 1/00* (2013.01); *B60L 50/66* (2019.02);
(Continued)

(58) Field of Classification Search
CPC ....................................................... B60K 1/04
See application file for complete search history.

(56) References Cited

U.S. PATENT DOCUMENTS

| 6,206,127 B1 * | 3/2001 | Zakula, Sr. | ............ B62D 7/026 180/234 |
| 6,557,658 B1 * | 5/2003 | Enmeiji | ............... B62D 7/1509 180/234 |

(Continued)

FOREIGN PATENT DOCUMENTS

| DE | 102008059968 A1 | 6/2010 |
| DE | 102011109024 A1 | 1/2013 |

(Continued)

OTHER PUBLICATIONS

Preliminary Report on Patentability of the International Searching Authority in English from corresponding Patent Cooperation Treaty (PCT) Application No. PCT/EP2016/076577, completed Mar. 2, 2018.

(Continued)

*Primary Examiner* — James A Shriver, II
*Assistant Examiner* — James J Triggs
(74) *Attorney, Agent, or Firm* — Gardner, Linn, Burkhart & Ondersma LLP

(57) ABSTRACT

A transport vehicle for containers, in particular a floor-bound and driverless heavy-load transport vehicle for ISO containers, has a platform for receiving at least one container to be transported, with the platform being delimited by guide elements for guiding a container when being deposited on the platform, and includes a drive unit and a battery module for supplying electric energy to the drive unit. The battery module has a support frame and a battery, with there being at least one air conditioner device arranged in the support frame together with the battery.

20 Claims, 5 Drawing Sheets

(51) Int. Cl.
- *A62C 27/00* (2006.01)
- *B60L 1/00* (2006.01)
- *B60L 53/80* (2019.01)
- *B60L 58/26* (2019.01)
- *B60L 50/60* (2019.01)
- *B60K 1/00* (2006.01)
- *G05D 1/02* (2006.01)

(52) U.S. Cl.
CPC ............... *B60L 53/80* (2019.02); *B60L 58/26* (2019.02); *B60P 1/6418* (2013.01); *B60K 2001/005* (2013.01); *B60K 2001/008* (2013.01); *B60K 2001/0438* (2013.01); *B60K 2001/0461* (2013.01); *B60L 2200/36* (2013.01); *B60Y 2200/14* (2013.01); *B60Y 2200/62* (2013.01); *G05D 1/021* (2013.01); *G05D 2201/0213* (2013.01)

(56) References Cited

U.S. PATENT DOCUMENTS

| | | | |
|---|---|---|---|
| 7,350,840 B2 * | 4/2008 | Franzen | B66C 19/007 294/81.4 |
| 8,128,064 B2 | 3/2012 | Franzen et al. | |
| 8,157,492 B2 | 4/2012 | Franzen et al. | |
| 8,651,793 B2 | 2/2014 | Franzen et al. | |
| 8,789,635 B2 | 6/2014 | Franzen et al. | |
| 8,965,615 B2 | 2/2015 | Brandenstein et al. | |
| 8,996,159 B2 | 3/2015 | Franzen et al. | |
| 9,522,623 B2 | 12/2016 | Franzen et al. | |
| 9,701,518 B2 * | 7/2017 | Rosenstrom | B66C 9/04 |
| 2014/0017045 A1 | 1/2014 | Wieschemann et al. | |
| 2014/0017046 A1 | 1/2014 | Wieschemann et al. | |
| 2016/0362033 A1 | 12/2016 | Hegewald et al. | |
| 2017/0182923 A1 | 6/2017 | Hegewald | |

FOREIGN PATENT DOCUMENTS

| | | |
|---|---|---|
| DE | 102012108768 A1 | 3/2014 |
| DE | 102013001473 A1 | 7/2014 |
| DE | 102014204263 A1 | 9/2015 |
| EP | 2440431 B1 | 9/2013 |
| WO | 2016005336 A2 | 1/2016 |

OTHER PUBLICATIONS

International Search Report of the International Searching Authority from corresponding Patent Cooperation Treaty (PCT) Application No. PCT/EP2016/076577, indicated completed on Feb. 10, 2017.
Written Opinion of the International Searching Authority from corresponding Patent Cooperation Treaty (PCT) Application No. PCT/EP2016/076577, indicated completed on Feb. 10, 2017.
International Preliminary Examination Report from corresponding Patent Cooperation Treaty (PCT) Application No. PCT/EP2016/076577, transmitted Oct. 13, 2017.
Co-pending U.S. Appl. No. 15/755,727, filed Feb. 27, 2018, entitled Heavy-Duty Lift Truck.
Commonly assigned co-pending U.S. Appl. No. 15/755,727, filed Feb. 27, 2018, entitled Heavy Duty Lift Truck.
Commonly assigned co-pending U.S. Appl. No. 16/062,317, filed Jun. 14, 2018, entitled Transport Vehicle for Containers.
Commonly assigned co-pending U.S. Appl. No. 16/062,341, filed Jun. 14, 2018, entitled Transport Vehicle for Containers.

* cited by examiner

TRANSPORT VEHICLE FOR CONTAINERS, COMPRISING A BATTERY MODULE FOR SUPPLYING THE DRIVE UNIT

CROSS REFERENCE TO RELATED APPLICATION

The present application claims the priority benefits of International Patent Application No. PCT/EP2016/076577, filed on Nov. 3, 2016, and claims benefit of DE 10 2015 119 193.8, filed on Nov. 7, 2015.

BACKGROUND OF THE INVENTION

The invention relates to a transport vehicle for containers, in particular a floor-bound and driverless heavy-duty transport vehicle for ISO containers, having a platform for receiving at least one container to be transported, which platform is delimited by guide elements for guiding a container when it is being set down on the platform, and having a drive unit and a battery module for supplying electrical energy to the drive unit, wherein the battery module comprises a support frame and a battery.

A transport vehicle for containers in terms of the preamble of claim 1 is already known from European patent EP 2 440 431 B1. The transport vehicle is designed as a driverless and floor-bound heavy-duty transport vehicle for ISO containers and has an electric drive unit which is supplied with electrical energy via a battery carried along by the transport vehicle. The battery is releasably connected to the transport vehicle in order for the battery to be moved out of the transport vehicle transversely with respect to the longitudinal direction of the transport vehicle so that it can be charged outside the transport vehicle, and to be moved into the transport vehicle after charging of the battery is complete. The battery is designed as a substantially cuboidal lead battery and is between 6 t and 10 tin weight. The transport vehicle has at least an admissible total weight of 40 t and is designed as a four-wheeled vehicle with two front wheels and two rear wheels. The front wheels can be driven by a first electric motor and the rear wheels can be driven by a second electric motor. An installation space for the battery, which space is open in the downwards direction and to the sides of the transport vehicle, is provided between the front wheels and rear wheels. Support rails are disposed extending transversely with respect to the longitudinal direction of the transport vehicle in the installation space, the battery being supported on said rails via laterally projecting bearing elements. Centring elements are disposed in the region of the bearing elements and support rails and orientate the bearing elements with respect to the support rails during movement of the battery into the installation space and lowering of the battery onto the support rails. Electrical contact elements are also disposed on the battery and electrical counter-contact elements are disposed in the region of the support rails and said elements can be connected automatically by the battery being lowered onto the support rails.

From the German laid-open document DE 10 2012 108 768 A1 a transport vehicle for containers in the form of a battery-electric trailer truck is known. The trailer truck accordingly has an electric drive unit which is supplied by the battery which is carried along. The battery, which is designed e.g. as a lithium-ion battery, is attached to the trailer truck in a releasable manner for charging purposes in order to be able to be charged outside the trailer truck. Furthermore, the trailer truck comprises a battery management system by means of which e.g. charging times can be optimised or the battery can be air-conditioned.

The German laid-open document DE 10 2011 109 024 A1 discloses an electric drive module for a utility vehicle with an electric drive. The drive module comprises lithium-ion cells and a cooling system.

From the German laid-open document DE 10 2008 059 968 A1 a motor vehicle is known which comprises a lithium-ion battery. The interior of the battery is connected to the coolant circuit of the motor vehicle's air-conditioning system. In this case a line is passed through the interior and can be opened within the interior in order to discharge coolant into the interior. A similar inclusion of the air-conditioning system of a vehicle into a battery cooling system is also known from DE 10 2014 204 263 A1.

SUMMARY OF THE INVENTION

The present invention provides an improved generic transport vehicle for containers.

In accordance with an embodiment of the invention an improved transport vehicle for containers, in particular a floor-bound and driverless heavy-duty transport vehicle for ISO containers, having a platform for receiving at least one container to be transported, which platform is delimited by guide elements for guiding a container as it is being set down on the platform, and having a drive unit and a battery module for supplying electrical energy to the drive unit, wherein the battery module comprises a support frame and a battery, is created in that the battery is designed as a lithium-ion battery and at least one air-conditioner device is disposed in the support frame in addition to the battery. Provision is preferably made that a fire-extinguishing system and/or a management system for the battery is additionally disposed in support frame.

In terms of the invention, a transport vehicle is preferably understood to be a vehicle which can transport a payload of at least 40 t. ISO containers and swap bodies can be considered as loads for the heavy-duty transport vehicles. Loaded swap bodies can generally weigh up to about 16 t. ISO containers in the loaded condition weigh 20 t to 80 t. The transportation of ISO containers is preferred. ISO containers are generally understood to be standardised bulk containers with standardised pick-up points or corners for load picking-up means. A transport vehicle which travels empty or transports an empty ISO container or swap body should also be understood in this way provided that this vehicle can transport a payload of at least 15 t, preferably at least 20 t. It may also be the case that such transport vehicles operate in mixed operation, i.e. they also transport other loads such as semi-trailers, swap trailers, trailers, heavy goods vehicles or tractive machines in addition to the ISO containers or swap bodies.

It is also preferred in terms of the invention that the transport vehicle is not rail-bound and can therefore travel freely.

A basic idea behind the present invention is to create a battery module for the drive unit of a generic transport vehicle for containers, with the battery module being of a compact construction which can be used—independently of the construction and size of the battery used—as a structural unit in such a special transport vehicle. By the combination of all additional functions associated with the battery, in particular cooling and possibly fire-protection, within the battery module it is ensured that the battery module can be exchanged rapidly since only one interface—which has to be coupled or uncoupled—from the battery module to the transport vehicle is provided. In contrast, if only the battery could be changed and all additional functions were fixedly installed in the transport vehicle, a plurality of interfaces would result, of which each individual one would have to be decoupled from the transport vehicle when changing the battery. The interchangeability of the battery module per se means that the downtime of the transport vehicle for maintenance purposes and/or charging purposes is reduced to a minimum. In this way, the duration of travel operation and thus also the handling capacity of the transport vehicle increase. For maintenance work and/or the charging process an interchangeable battery module is substantially simpler since easier accessibility outside the transport vehicle is ensured. Maintenance can then take place at a secure work station, in particular if maintenance work must be carried out on a fire-extinguishing system of the battery module. The support frame in accordance with the invention offers closed containment of the battery with the air-conditioner device and possibly the fire-extinguishing system and possibly the management system.

In conjunction with the present invention the air-conditioner device is to be understood as a heating and/or ventilation and/or cooling device. The choice of an air-conditioner device which provides all three functions or only one or two of said functions will be selected in conjunction with the area of application of the battery module or of the transport vehicle. In many areas of application, a ventilation device may suffice to keep or bring a battery, in a preferred manner, to temperatures in the range of 20 to 25° C. The air-conditioner device can heat or cool the battery by means of air or liquids. Cooling devices using cooling liquids are advantageously smaller in size.

The fire-extinguishing system is advantageously a $CO_2$ fire-extinguishing system.

The battery is preferably designed as a lithium-ion battery since the times for the charging cycles are relatively short and are in the range of about 20 minutes. Thus for the charging process a lithium-ion battery remains in the transport vehicle itself. Interchanging of the batteries, as in the case of lead batteries, is not required owing to the substantially shorter charging times of lithium-ion batteries. The shorter charging times of the lithium-ion batteries do not detract from the duration of travel operation and thus also do not detract from the handling capacity of the transport vehicle. Lithium-ion batteries are substantially lighter and usually also take up less volume than lead batteries of the same capacity. Lithium-ion batteries do not require further media, such as e.g. water or air, which lead batteries require. Similarly, lithium-ion batteries require no rest periods after charging as comparable lead batteries do and, during charging of lithium-ion batteries, no gasses (hydrogen compounds, e.g. oxyhydrogen gas) are produced. Changing of lithium-ion batteries is thus preferably provided only for maintenance purposes and not for charging purposes.

Changeability of the battery module and suspension thereof in the transport vehicle is facilitated by the fact that the support frame is self-supporting.

Provision is preferably made for the battery to supply the air-conditioner device and possibly the fire-extinguishing system and possibly also the management system with electrical energy. The associated functions are therefore available both in the operating state of the battery module suspended in the transport vehicle and also during the changing and/or charging process. In this respect the battery module is autonomous, provided the charge state of the battery allows this. Therefore, transport also in the sense of dispatching or delivering batteries designed as lithium-ion batteries is more easily possible.

Provision is advantageously made that, for the purpose of a change for charging the battery and/or maintenance of the battery, in particular of the fire-extinguishing system, outside the transport vehicle, the battery module is releasably connected to the transport vehicle. Therefore, maintenance and/or the charging process can take place outside the transport vehicle in an appropriately secured area.

In this case it is preferred that the battery module can be moved into and out of the transport vehicle transversely to the longitudinal direction of said vehicle. Provision is also advantageously made that the battery module is suspended during operation in an installation space of the transport vehicle, which is open in the downwards direction and on at least one side.

Furthermore, in terms of the invention, a battery change or battery module change is to be understood as being in conjunction with maintenance and/or charging of the battery in order to increase the availability of the transport vehicle and not to minimise it by the long maintenance and/or charging process of a battery fixedly installed in the transport vehicle. In principle, a fixedly installed battery can also be installed and removed. However, this is not a change in terms of the invention. Therefore, installation of a battery otherwise fixedly installed in the transport vehicle or exchanging a defective, fixedly installed battery is not to be understood as a change.

The invention is explained in more detail hereinunder with the aid of an exemplified embodiment illustrated in the drawings.

DESCRIPTION OF THE PREFERRED EMBODIMENTS

Figure 1:
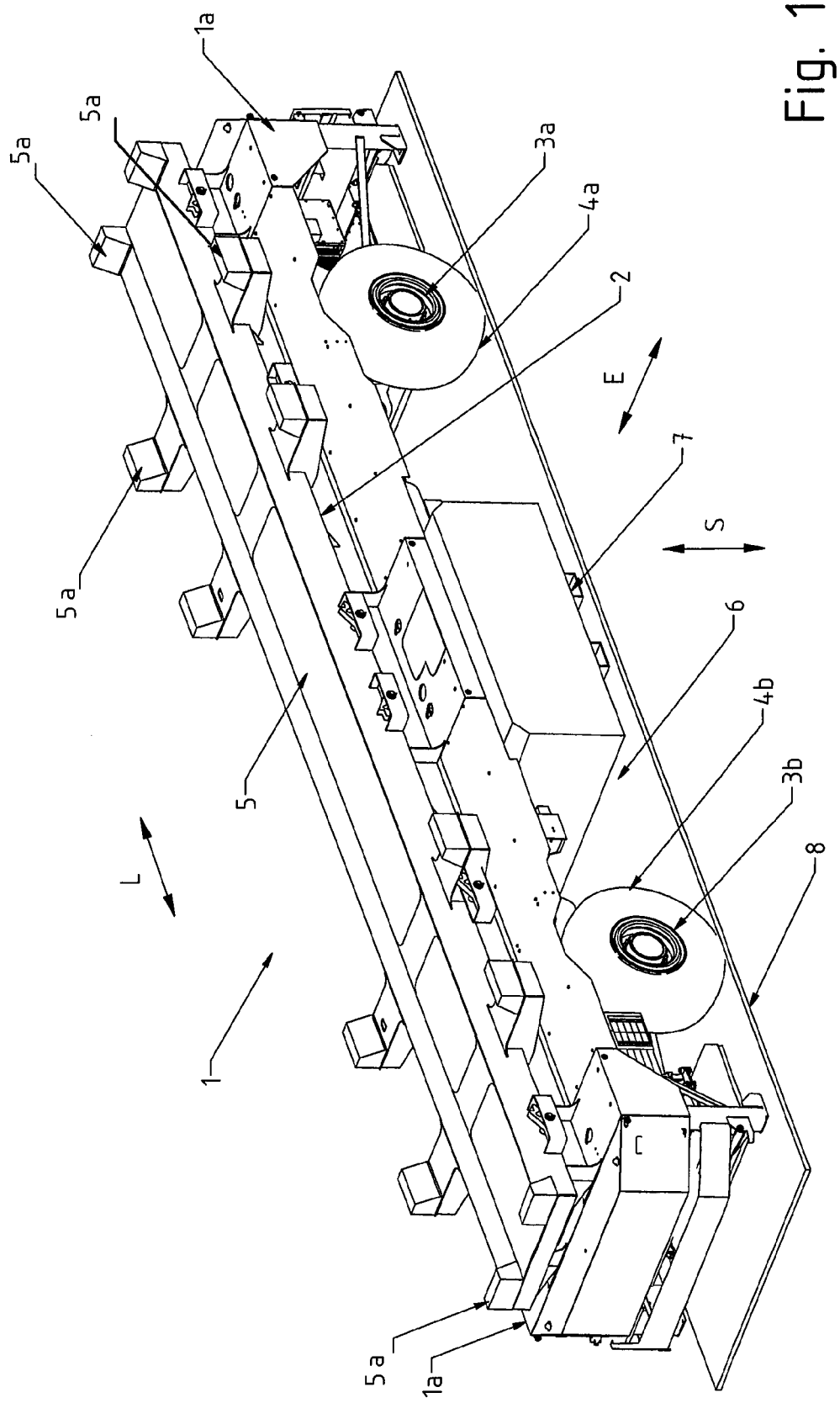
FIG. 1 shows a perspective view obliquely from above of a floor-bound and driverless transport vehicle for ISO containers.

FIG. 1 shows a perspective view obliquely from above of a floor-bound and driverless transport vehicle 1 for ISO containers. The transport vehicle 1 is designed as a heavy-duty transport vehicle and has an unladen weight of about 35 tonnes. Additional thereto is the weight of the ISO container(s) to be transported so that, in the laden state, a total weight of about 85 tonnes is achieved. The transport vehicle 1 has at least a permissible total weight of 40 t and is designed as a four-wheeled vehicle. The transport vehicle 1 also consists essentially of a vehicle frame 2 on which, on a common front axle 3a, two front wheels 4a and, on a common rear axle 3b, two rear wheels 4b are mounted. The four wheels 4a, 4b are provided with tyres, preferably rubber tyres, so that the transport vehicle 1 is not rail-bound but can travel freely over a ground surface 8. A preferably flat platform 5 is supported by the vehicle frame 2 and serves to receive the ISO containers, not illustrated, which are to be transported. The size of the platform 5 is selected in such a way that, as seen in a longitudinal direction L of the transport vehicle 1, two 20 foot containers can be transported one behind the other or a 40 foot container or a 45 foot container can be transported. The platform 5 can be designed to be passive in the sense of being rigidly connected to the vehicle frame 2 or can be active. In this connection, 'active' is understood to mean that the platform 5 can be raised and lowered in a vertical direction and relative to the vehicle frame 2 in order to actively pick up or set down containers.

In order to guide a container to be transported as it is being set down on the platform 5 and to be able to orientate it in relation to the platform 5, the platform 5 is delimited at its sides by a plurality of guide elements 5a. For this purpose the guide elements 5a have guide surfaces which extend in an inclined manner. In this case, the guide surfaces extend outwards away from the platform 5 and inwards towards the platform 5. The guide elements 5a are preferably disposed in pairs on opposing sides, in particular long sides and/or short sides, of the platform 5. The guide surfaces of one pair of guide elements 5a form a type of funnel, the inclined extension of which tapers towards the platform 5 in order to achieve the guiding and orientating function. Accordingly, the guide surfaces of a pair of guide elements 5a widen in the upwards direction away from the platform 5.

It can be seen that the vehicle frame 2 comprises an installation space 6 for a battery module 7. The battery module 7 consists, as an integral component, substantially of one or a plurality of batteries 7a, a cuboidal, self-supporting and closed support frame 7b, a management system 7c, an air-conditioner device 7d and a fire-extinguishing system 7e. Only one battery 7a will be mentioned hereinunder for simplification. The installation space 6 for the battery module 7 begins underneath the platform 5 of the vehicle frame 2 and is open in the downwards direction towards the ground surface 8 and at the sides 1a of the transport vehicle 1. As shown in FIG. 1, the sides 1a are long sides of the transport vehicle 1. Furthermore, the installation space 6 is located between the front and the rear wheels 4a, 4b of the transport vehicle 1. Since the installation space 6, as seen in the longitudinal direction L of the transport vehicle 1, is open towards the right and left side 1a a change of the battery module 7 in order to charge and/or maintain a battery 7a of the battery module 7 outside the transport vehicle 1 is effected easily by a movement transversely to the longitudinal direction L of the transport vehicle 1 in a loading and unloading direction E. Furthermore, the installation space 6 is open in the downwards direction so that the battery module 7 can be loaded and unloaded by forklift-type conveying apparatuses. The battery 7a is designed as a lithium-ion battery. The battery module 7 has an approximate weight of 4 to 6 tonnes. In the case of a lithium-ion battery, provision is made for changing same only for maintenance purposes.

During charging, lithium-ion batteries become extremely hot. Temperatures of up to 80° C. and higher can be reached. Rises in temperature can also occur during the discharge of electrical energy, in particular in the case of high capacities over a short time. Thus it is necessary to cool lithium-ion batteries or to operate them in a constant ambient temperature which is usually in the range of 20° C. to 25° C. Depending on the climatic conditions of an area of application, air cooling may be sufficient. However, if the ambient temperature is higher than 25° C., which certainly occurs in very many regions of the Earth, the cooling air must then be cooled using an air-conditioner device. It is also feasible that there may be cases of use where the air flowing round the battery is heated. Furthermore, it is not impossible that lithium-ion batteries pose a fire risk, in particular in the case of high internal temperatures. In a fire, lithium independently burns particularly well. A lithium fire should be put out using a $CO_2$-based fire-extinguishing system.

In order to permanently check the state, e.g. the charging state, temperature and current of the lithium-ion batteries, in particular the inner cells in the lithium-ion battery, and then to be able to intervene appropriately in the event of abnormalities, a management system 7c for the battery 7a is installed. This is also able to electrically switch the cells of the lithium-ion batteries in such a way that the voltages of the cells are somewhat balanced out. The management system 7c is then connected in terms of control technology to the air-conditioner device 7d and the fire-extinguishing system 7e in order, when necessary, to cool or heat the battery 7a or to trigger the fire-extinguishing system 7e in an emergency.

Figure 2:
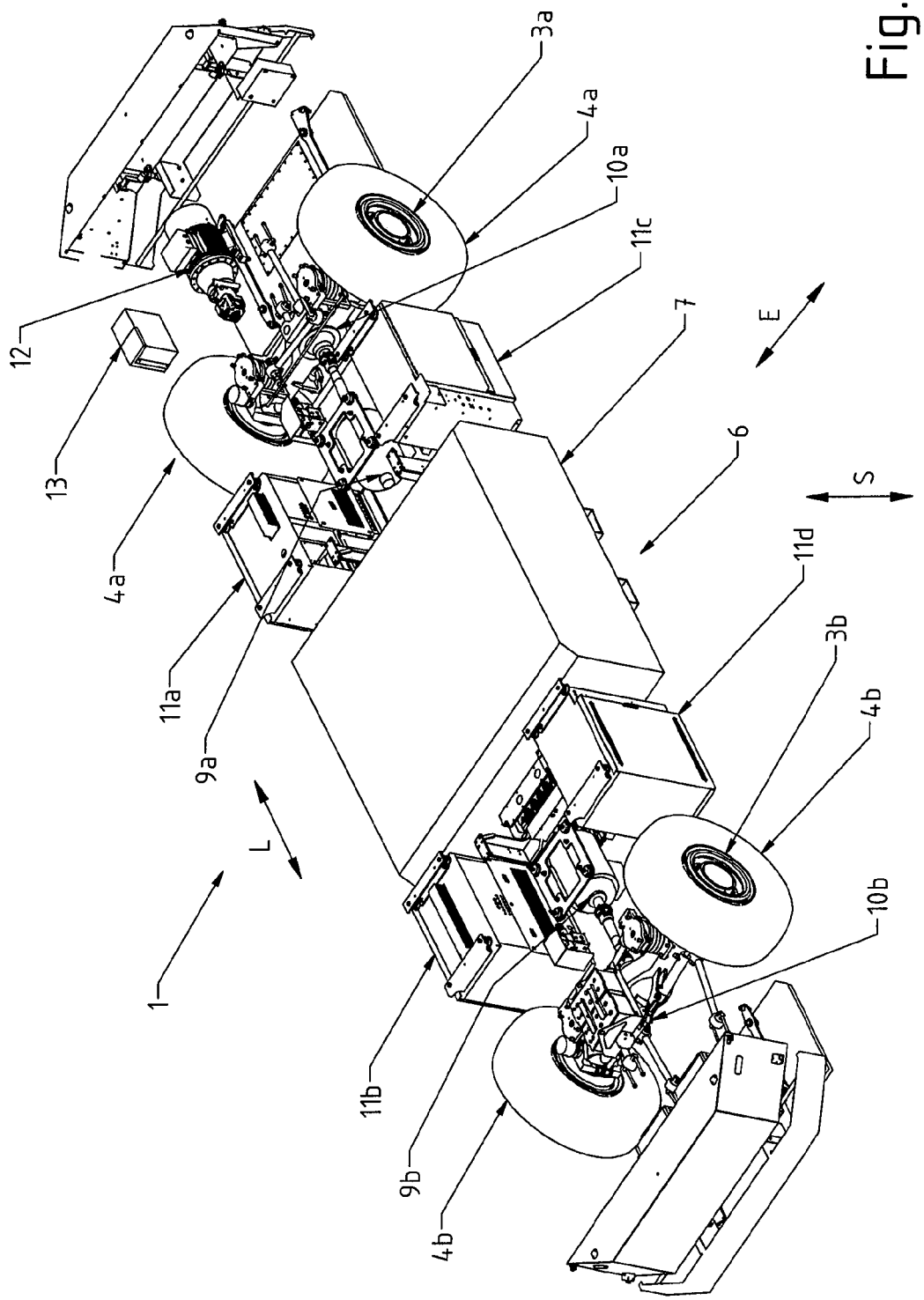
FIG. 2 shows a perspective view according to FIG. 1 without the vehicle frame of the transport vehicle.

FIG. 2 shows a further perspective view of the transport vehicle 1, again seen obliquely from above but now with the vehicle frame 2 omitted in order to allow further components of the transport vehicle 1 to be seen. In addition to the elements depicted in FIG. 1, FIG. 2 additionally shows an electric drive unit of the transport vehicle 1, which consists essentially of a front electric motor 9a, a front power take-off gear 10a, a rear electric motor 9b and a rear power take-off gear 10b. As seen in the longitudinal direction L of the transport vehicle 1, the front electric motor 9a is attached below the vehicle frame 2 centrally and in the region of the front axle 3a. As seen in the longitudinal direction L of the transport vehicle 1, the rear electric motor 9b is attached below the vehicle frame 2 centrally and in the region of the rear axle 3b. The front electric motor 9a drives the two front wheels 4a via the front power take-off gear 10a, and the rear electric motor 9b drives the two rear wheels 4b via the rear power take-off gear 10b. Therefore, the transport vehicle 1 has an all-wheel drive.

Furthermore, it can be seen that, between the battery module 7 and the front axle 3a, space is provided for suspension of control cabinets 11a to 11d below and laterally on the vehicle frame 2 in order to receive control components. The control cabinet 11a is a hydraulic control cabinet; the control cabinet 11b is a drive system control cabinet and the remaining control cabinets 11c and 11d are provided for other control tasks such as e.g. navigation or power components such as an inverter, in order to convert the direct current of the battery 7a into an alternating current for the electric motors 9a and 9b and a hydraulic unit 12. In the region of the front wheels 3a space is provided for the hydraulic unit 12, which is also electrically driven and via which the hydraulic components such as e.g. lifting drives for the containers can be supplied. An electric plug element 13 is likewise disposed in this region of the transport vehicle 1 on the side 1a of the transport vehicle 1. By means thereof, the battery 7a can be charged while remaining in the transport vehicle 1.

Figure 3:
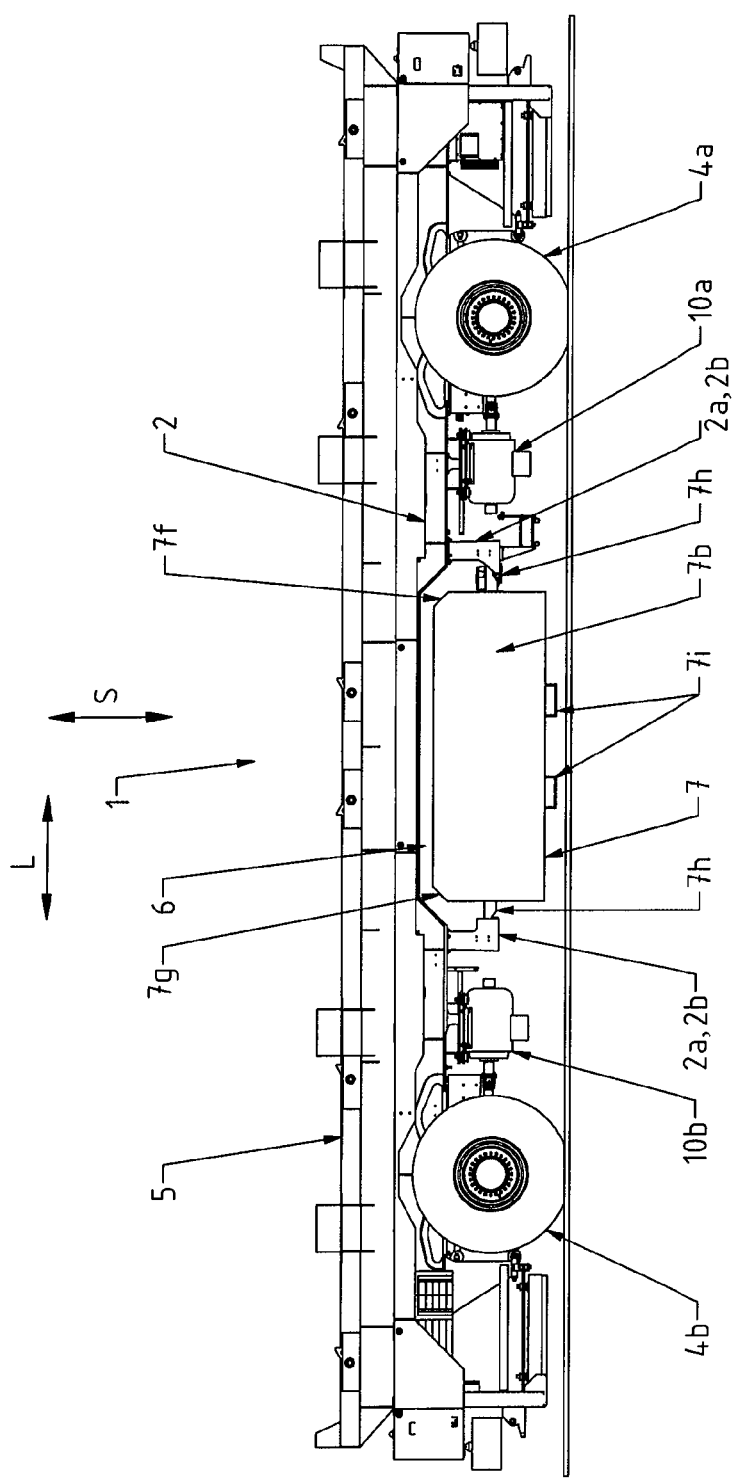
FIG. 3 shows a side view of the transport vehicle of FIG. 1.

FIG. 3 shows a side view of the transport vehicle 1. It is particularly clear therefrom that the battery module 7 is suspended on the vehicle frame 2 of the transport vehicle 2 via support rails 2a. The two support rails 2a are disposed at a distance from one another, orientated horizontally with respect to one another and attached or suspended via brackets 2b at one level on the vehicle frame 2. As seen in the longitudinal direction L of the vehicle, the support rails 2a delimit the installation space 6 to the front and rear. In order to be able to suspend the battery module 7 or the support frame 7b of the battery module 7 on the support rails 2a, suspension elements 7h, which project forwards and rearwards as seen in the longitudinal direction of the transport vehicle 1, are disposed laterally on the cuboidal support frame 7b and in particular at its front and rear side walls 7f, 7g and in the region of central supports of the vehicle frame 2. When the battery module 7 is in the operating state, the suspension elements 7h lie on the support rails 2a of the transport vehicle 1 and therefore bear the whole weight of the battery module 7 and absorb any forces which arise during operation of the transport vehicle 1. The suspension elements 7h are each disposed inwardly offset from the side by about one third of the width of the battery module 7. By suspending the battery module 7 within the vehicle frame 2 in this manner a forklift truck or another lifting device or conveying apparatus can easily travel under the battery module 7. For this purpose, two pockets 7i extending in the loading and unloading direction E are disposed on the bottom face of the battery module 7 and can securely receive the forks of the forklift truck or the other lifting device. The pockets 7i are formed e.g. by U-shaped supports disposed on the bottom face of the battery module 7. Then, by a movement of the forklift truck or of the other lifting device in a vertical raising and lowering direction S, the suspension elements 7h are raised from the support rail 2a and then the battery module 7 can be moved out of the transport vehicle 1 in a direction E for placing goods into or out of storage. Provision is additionally made that, by means of the vertical movement in the raising and lowering direction S, the battery module 7 with the battery 7a is orientated on the support rails 2a via centring elements 16 (see FIG. 6), secured against slipping and can be released from the centring elements 16. In addition, by the movement in the raising or lowering direction S, electric contact units 15, which are also provided, can be released or connected by plugs and sockets on the battery module 7a or the battery 7a in the region of the support rails 2a for an electrical connection of the battery module 7 or of the battery 7 to the transport vehicle 1, in particular the drive unit thereof. The advantage of this is that the transport vehicle 1 can be designed to be passive with respect to the centring and contacting of the battery module 7 and its battery 7a.

Figure 4:
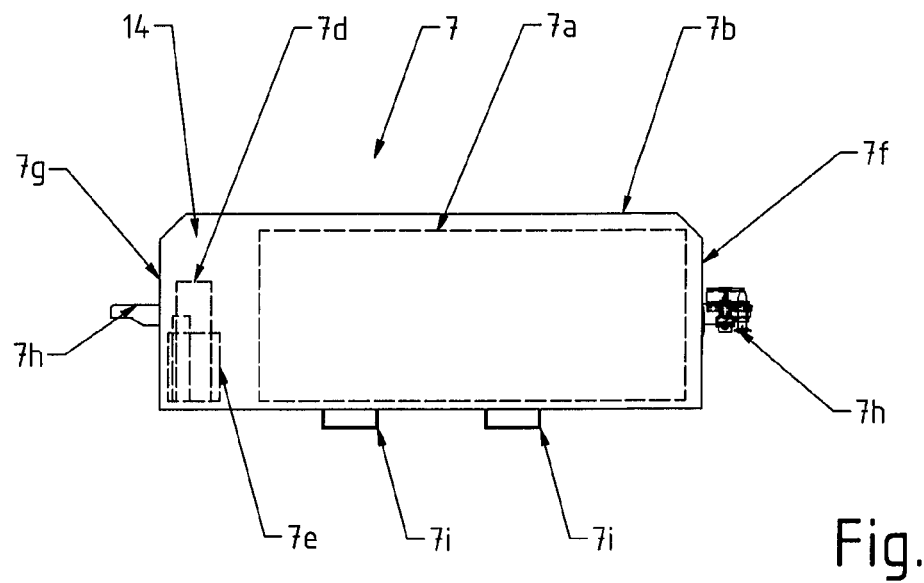
FIG. 4 shows a detail view of a battery module in accordance with the invention.

FIG. 4 shows a detail view of a battery module 7 in accordance with the invention. The battery module 7 is an assembly which includes a battery 7a, a cuboidal, self-supporting and closed support frame 7b, a management system 7c, an air-conditioner device 7d and a fire-extinguishing system 7e. The self-supporting support frame 7b is designed as a container or as a trough with a cover and connects the battery 7a, the management system 7c, the air-conditioner device 7d and the fire-extinguishing system 7e to a battery module 7 which is adapted to the installation space 6 or the corresponding transport vehicle 1. The battery 7a occupies the majority of the volume of the support frame 7b. In this case, the battery 7a is likewise designed as a cuboid but smaller than the support frame 7b so that on one side of the battery 7b a receiving space 14 remains for the management system 7c, the air-conditioner device 7d and the fire-extinguishing system 7e. In relation to a battery 7a designed as a lithium-ion battery the fire-extinguishing system 7e is designed as a $CO_2$ fire-extinguishing system. The air-conditioner device 7d serves for active temperature regulation, in particular cooling, of the battery 7b. During charging of the battery 7b, in particular over a short time, heat is produced which is actively discharged via the air-conditioner device 7d. Furthermore, the battery 7b operates optimally at a constant ambient temperature. The support frame 7b is formed overall as a trough with a cover and is therefore closed during operation except for the openings for air-conditioning—if required for air cooling. The battery 7a supplies the management system 7c, the air-conditioner device 7d and the fire-extinguishing system 7e with electrical energy even outside the transport vehicle 1.

Figure 5:
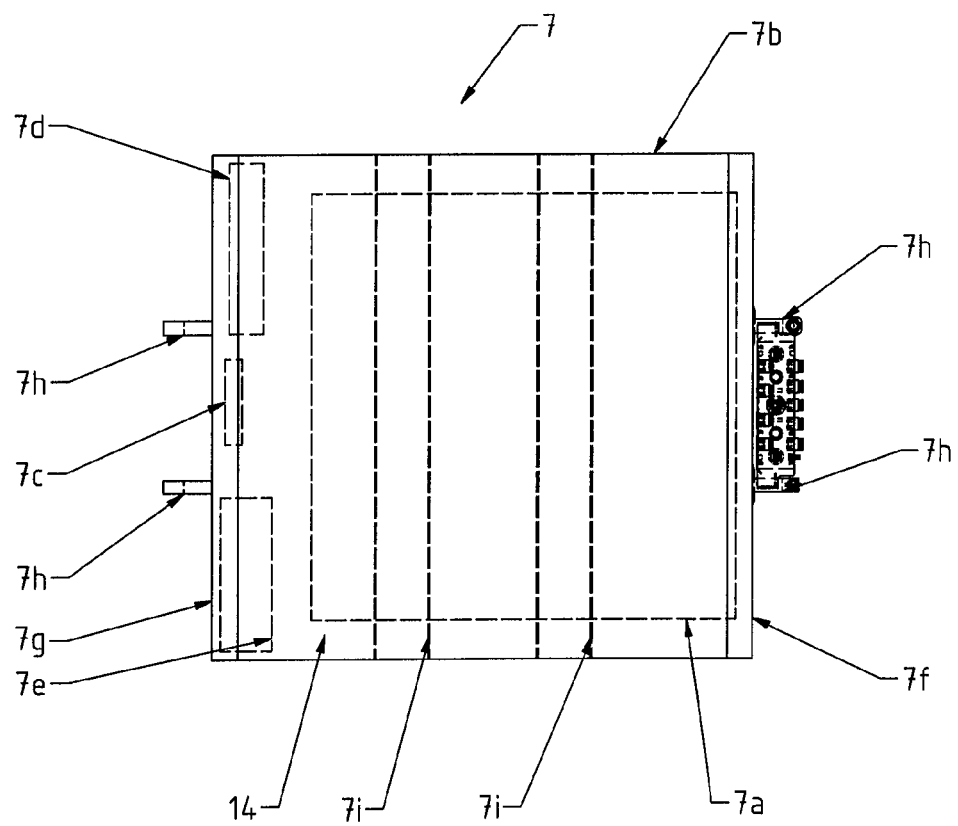
FIG. 5 shows a plan view of FIG. 4.

FIG. 5 shows a plan view of FIG. 4, which shows that the receiving space 14 is cuboidal and, in the longitudinal direction L of the transport vehicle 1, is delimited at the front by the battery 7a and at the rear by the rear side wall 7g of the support frame 7b.

Figure 6:
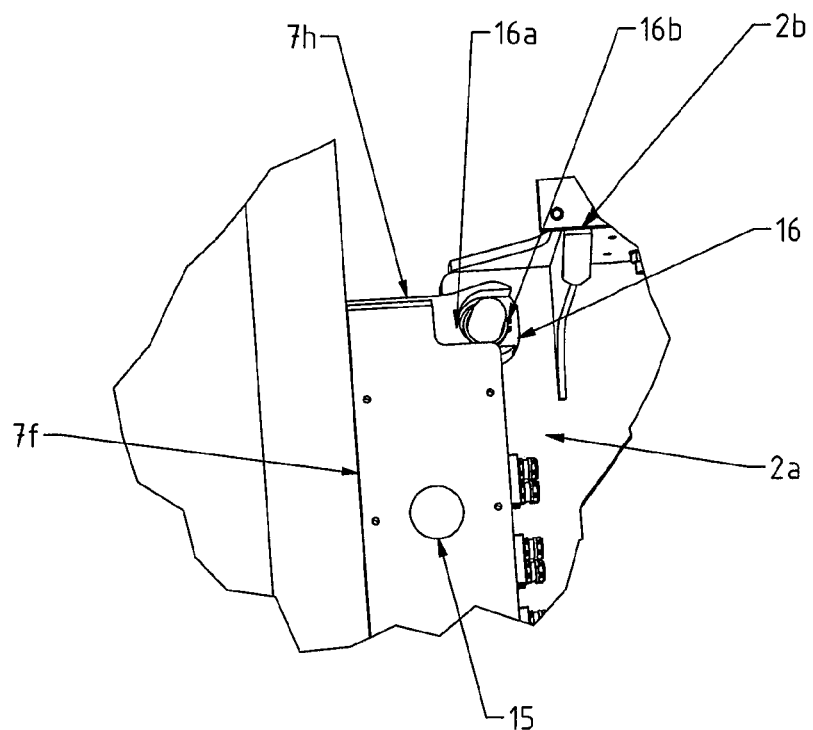
FIGS. 6 and 7 show enlarged sections of the region of suspension of the battery module.
Figure 7:
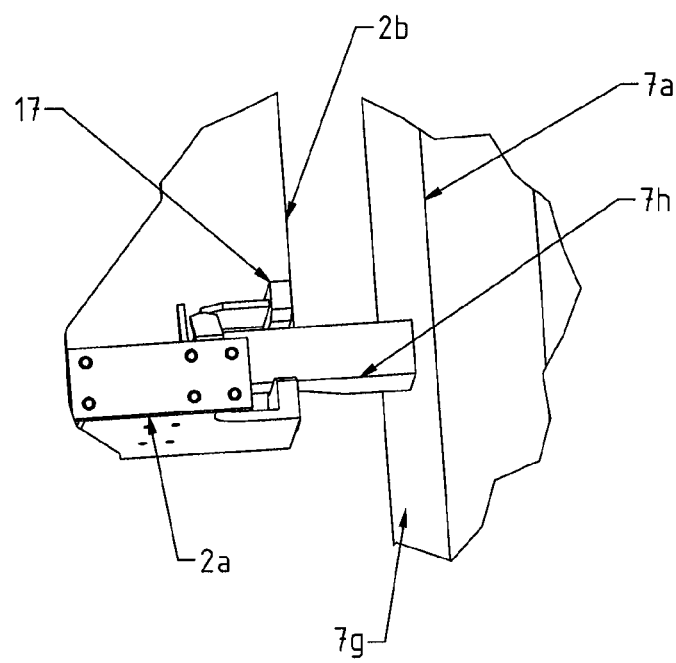

FIGS. 6 and 7 each show enlarged sections of the region of suspension of the battery module 7 on the vehicle frame 2.

FIG. 6 shows the bearing elements 7h on the front side wall 7f of the support frame 7b. At a free end, the bearing elements 7h and the support rails 2a are designed as centring elements 16 in order to orientate the battery module 7 with respect to the support rail 2a during suspension in the vehicle frame 2. For this purpose each centring element 16 consists of an annular fork 16a on the bearing element 7h and a conical pin 16b on the support rail 2a. One centring element 16 is provided for each bearing element 7h. Between the two bearing elements 7h a separable electrical contact unit 15 is disposed on the front side wall 7f and on the support rail 2a and extends flat and horizontally. This contact unit 15 schematically illustrated in FIG. 6 consists of a plurality of plugs and sockets and further centring elements in order to produce an electrical contact automatically via the lowering movement in the raising and lowering direction S of the battery module 7 onto the support rail 2a. The contact unit 15 produces the connection for control signals and electrical energy. In this case, the plugs are disposed on the support frame 7b and the sockets on the support rail 2a. The contact unit 15 can be omitted when the battery 7a is fixedly installed in the vehicle.

FIG. 7 shows the bearing elements 7h on the rear side wall 7g of the support frame 7b. At a free end, one of the two bearing elements 7h is laterally guided in a u-shaped retaining element 17 which is open in the upwards direction.

Areas of application of the above-described transport vehicles 1 and of the associated battery-changing systems are the handling of ISO containers in ports and in intermodal traffic between road and rail.

The present invention has been described with the aid of a floor-bound transport vehicle 1 for the transport of ISO containers. It is fundamentally possible also to transport other heavy loads such as e.g. slabs or coils in the iron and steel industries and in rolling mills. The transport vehicles can also be designed as so-called terminal trucks, gantry lift stackers, straddle carriers or reach stackers. Terminal trucks are to be understood as being trailer trucks with tractive machines and semi-trailers. A terminal truck, in particular the semi-trailer, also designated as a trailer, thereof thus likewise comprises a platform 5 delimited by guide elements 5a in the sense described above. The transport vehicles 1 can also comprise more than two axles, of which only one or all is/are electrically driven. An electrical individual wheel drive is also feasible. In addition to the drive unit all other drives of the transport vehicle 1 can also be electrical or electro-hydraulic.

It is self-evident that the battery module 7 can also be used to supply electrical energy to other electrical consumers in addition to the drive unit.

The invention claimed is:
1. A transport vehicle comprising a floor-bound and driverless heavy-duty transport vehicle for ISO containers, the transport vehicle having a platform for receiving at least one container to be transported, which platform is delimited by guide elements for guiding a container as it is being set down on the platform, and having a drive unit and a battery module for supplying electrical energy to the drive unit, wherein the battery module comprises a support frame and a battery, and wherein the battery is designed as a lithium-ion battery and at least one air-conditioner device and a management system for the battery are disposed in the support frame in addition to the battery.

2. The transport vehicle as claimed in claim 1, wherein a fire-extinguishing system is additionally disposed in the support frame.

3. The transport vehicle as claimed in claim 2, wherein the fire-extinguishing system is a $CO_2$ fire-extinguishing system.

4. The transport vehicle as claimed in claim 1, wherein the support frame is self-supporting.

5. The transport vehicle as claimed in claim 1, wherein the battery supplies the air-conditioner device with electrical energy.

6. The transport vehicle as claimed in claim 1, wherein the battery module is releasably connected to the transport vehicle, for the purpose of a change for at least one of the maintaining or the charging of the battery outside the transport vehicle.

7. The transport vehicle as claimed in claim 1, wherein the battery module is movable into and out of the transport vehicle transversely to the longitudinal direction of the transport vehicle.

8. The transport vehicle as claimed in claim 1, wherein the battery module is suspended during operation in an installation space of the transport vehicle, which is open in the downwards direction and on at least one side.

9. The transport vehicle as claimed in claim 5, wherein the battery supplies at least one of the fire extinguishing system and the management system with electrical energy.

10. The transport vehicle as claimed in claim 2, wherein the support frame is self-supporting.

11. The transport vehicle as claimed in claim 10, wherein the fire-extinguishing system is a $CO_2$ fire-extinguishing system.

12. The transport vehicle as claimed in claim 10, wherein the battery supplies the air-conditioner device with electrical energy, and wherein the battery supplies at least one of the fire extinguishing system and the management system with electrical energy.

13. The transport vehicle as claimed in claim 12, wherein the battery module is releasably connected to the transport vehicle, for the purpose of a change for at least one of the maintaining or the charging of the battery outside the transport vehicle.

14. The transport vehicle as claimed in claim 13, wherein the battery module can be moved into and out of the transport vehicle transversely to the longitudinal direction of the transport vehicle.

15. The transport vehicle as claimed in claim 14, wherein the battery module is suspended during operation in an installation space of the transport vehicle, which is open in the downwards direction and on at least one side.

16. A transport vehicle comprising a floor-bound and driverless heavy-duty transport vehicle for ISO containers, the transport vehicle having a platform for receiving at least one container to be transported, which platform is delimited by guide elements for guiding a container as it is being set down on the platform, and having a drive unit and a battery module for supplying electrical energy to the drive unit, wherein the battery module comprises a support frame and a battery, and wherein the battery is designed as a lithium-ion battery and at least one air-conditioner device and a management system for the battery are disposed in the support frame in addition to the battery, wherein the support frame is self-supporting and the battery module is releasably connected to the transport vehicle.

17. The transport vehicle as claimed in claim 16, wherein a fire-extinguishing system is additionally disposed in the support frame.

18. The transport vehicle as claimed in claim 16, wherein the battery supplies the air-conditioner device with electrical energy.

19. The transport vehicle as claimed in claim 16, wherein the battery module can be moved into and out of the transport vehicle transversely to the longitudinal direction of the transport vehicle.

20. The transport vehicle as claimed in claim 16, wherein the battery module is suspended during operation in an installation space of the transport vehicle, which is open in the downwards direction and on at least one side.

* * * * *

UNITED STATES PATENT AND TRADEMARK OFFICE
CERTIFICATE OF CORRECTION

PATENT NO. : 10,358,023 B2
APPLICATION NO. : 15/773116
DATED : July 23, 2019
INVENTOR(S) : Mike Hegewald, Jannis Moutsokapas and Peter Köhn It is certified that error appears in the above-identified patent and that said Letters Patent is hereby corrected as shown below:

In the Specification

Column 1
Line 38, "10 tin weight" should be --10 t in weight--

Signed and Sealed this
Tenth Day of November, 2020

Andrei Iancu
*Director of the United States Patent and Trademark Office*